US012538074B2

(12) United States Patent
Margalit et al.

(10) Patent No.: US 12,538,074 B2
(45) Date of Patent: Jan. 27, 2026

(54) SYSTEM AND METHOD FOR GENERATING AN AUDIO SIGNAL

(71) Applicant: Sonicedge Ltd., Shoham (IL)

(72) Inventors: Mordehai Margalit, Zichron Yaaqov (IL); Jørgen Kragh Jakobsen, Værløse (DK)

(73) Assignee: SONICEDGE LTD., Shoham (IL)

( * ) Notice: Subject to any disclaimer, the term of this patent is extended or adjusted under 35 U.S.C. 154(b) by 220 days.

(21) Appl. No.: 18/096,624

(22) Filed: Jan. 13, 2023

(65) Prior Publication Data

US 2023/0247357 A1 Aug. 3, 2023

Related U.S. Application Data

(60) Provisional application No. 63/304,015, filed on Jan. 28, 2022.

(51) Int. Cl.
*H04R 3/04* (2006.01)
*H04R 19/02* (2006.01)
*H04R 31/00* (2006.01)

(52) U.S. Cl.
CPC ............... *H04R 3/04* (2013.01); *H04R 19/02* (2013.01); *H04R 31/00* (2013.01)

(58) Field of Classification Search
CPC .......... H04R 3/04; H04R 19/02; H04R 31/00; H04R 1/005; H04R 2217/03; G10K 15/04
USPC ............................................................ 381/98
See application file for complete search history.

(56) References Cited

U.S. PATENT DOCUMENTS

| | | | | |
|---|---|---|---|---|
| 7,571,014 | B1 * | 8/2009 | Lambourne | G06F 3/165 700/94 |
| 8,861,752 | B2 | 10/2014 | Margalit | |
| 2011/0169755 | A1 * | 7/2011 | Murphy | G06F 9/451 345/173 |
| 2013/0191749 | A1 * | 7/2013 | Coburn, IV | G06F 3/0482 715/716 |
| 2013/0243199 | A1 * | 9/2013 | Kallai | G11B 19/02 381/17 |
| 2016/0277838 | A1 | 9/2016 | Kupershmidt | |
| 2016/0277845 | A1 | 9/2016 | Kupershmidt | |
| 2016/0360320 | A1 | 12/2016 | Margalit | |
| 2016/0360321 | A1 | 12/2016 | Margalit | |
| 2017/0006386 | A1 * | 1/2017 | Margalit | H04R 3/04 |
| 2020/0314569 | A1 * | 10/2020 | Morgan | H04R 1/22 |
| 2021/0067865 | A1 * | 3/2021 | Margalit | H04R 31/00 |
| 2021/0195335 | A1 * | 6/2021 | Margalit | H04S 1/005 |
| 2022/0038111 | A1 * | 2/2022 | Morgan | H02P 7/29 |

* cited by examiner

*Primary Examiner* — Carolyn R Edwards
*Assistant Examiner* — Friedrich Fahnert
(74) *Attorney, Agent, or Firm* — Manelli Selter PLLC; Edward Stemberger

(57) ABSTRACT

Techniques described herein generally relate to generating an audio signal with a speaker. In some examples, a speaker device is described that includes a membrane and a shutter and driver device is configured to receive an audio signal, modulate it and generate electric signals to operate the speaker and generate an acoustic audio signal.

19 Claims, 15 Drawing Sheets

SYSTEM AND METHOD FOR GENERATING AN AUDIO SIGNAL

This application claims priority from U.S. Provisional Application No. 63/304,015, filed on Jan. 28, 2022, the contents of which are hereby incorporated by reference herein.

TECHNICAL FIELD

The present disclosure generally relates to systems and methods for generating an audio signal. In some examples the system and methods of generating an audio signal are applied in a mobile, wearable, or portable device. In other examples the system and methods of generating an audio signal are applied in earphones, headsets, hearables, or hearing aids.

BACKGROUND OF THE DISCLOSURE

U.S. Pat. No. 8,861,752 describes a picospeaker which is a novel sound generating device and a method for sound generation. The picospeaker creates an audio signal by generating an ultrasound acoustic beam which is then actively modulated. The resulting modulated ultrasound signal has a lower acoustic frequency sideband which corresponds to the frequency difference between the frequency of the ultrasound acoustic beam and the modulation frequency. US 20160360320 and US 20160360321 describe MEMS architectures for realizing the picospeaker. US 20160277838 describes one method of implementation of the picospeaker using MEMS processing. US 20160277845 describes an alternative method of implementation of the picospeaker using MEMS processing.

State of art approaches to operate the picospeaker do not provide the required performance in terms of noise, dynamic range, harmonic distortion, and latency. Furthermore, the power draw of the circuitry is prohibitive for some applications. Hence it is desirable to provide an architecture and method of operating the picospeaker which resolve these issues.

Glossary

- "acoustic signal"—as used in the current disclosure means a mechanical wave traversing either a gas, liquid or solid medium with any frequency or spectrum portion between 10 Hz and 10,000,000 Hz.
- "audio" or "audio spectrum" or "audio signal"—as used in the current disclosure means an acoustic signal or portion of an acoustic signal with a frequency or spectrum portion between 10 Hz and 20,000 Hz.
- "speaker" or "pico speaker" or "micro speaker" or "nano speaker"—as used in the current disclosure means a device configured to generate an acoustic signal with at least a portion of the signal in the audio spectrum.
- "membrane"—as used in the current disclosure means a flexible structure constrained by at least two points.
- "blind"—as used in the current disclosure means a structure with at least one acoustic port through which an acoustic wave traverses with low loss.
- "shutter"—as used in the current disclosure means a structure configured to move in reference to the blind and increase the acoustic loss of the acoustic port or ports.
- "acoustic medium"—as used in the current disclosure means any of but not limited to; a bounded region in which a material is contained in an enclosed acoustic cavity; an unbounded region where in which a material is characterized by a speed of sound and unbounded in at least one dimension. Examples of acoustic medium include but are not limited to; air; water; ear canal; closed volume around ear; air in free space; air in tube or another acoustic channel.

SUMMARY

Some embodiments of the present disclosure may generally relate to a speaker device that includes at least one membrane and shutter. The membrane is positioned in a first plane and configured to oscillate along a first directional path and at a first frequency effective to generate an ultrasonic acoustic signal. The shutter is positioned in a second plane that is substantially separated from the first plane. The shutter is configured to modulate the ultrasonic acoustic signal such that an audio signal is generated. The speaker device is connected to a driver device where the driver device supplies at least two electrical signals to operate the speaker device at least one membrane and shutter respectively. The driver device receives an input audio signal from which it generates a modulated audio signal to operate the membrane and generate an ultrasonic modulated signal. The driver further operates the shutter at the modulation frequency to demodulate the ultrasonic modulated signal and generate an acoustic audio signal.

Other embodiments of the present disclosure may generally relate to a speaker device comprising an array of membranes and shutters. The array of membranes and shutters operate either independently or driven by together by the driver device. In one example, the driving device is a semiconductor integrated circuit which includes; a controller; a charge pump configured to generate a high voltage signal; a switching unit configured to modulate the high voltage signal. The driving device receives a digital sound data stream and an operating voltage and outputs driving signals for the membrane, and shutter. In some embodiments the membrane and shutter operate asynchronously and or independently of each other at one or more frequencies. In other embodiments the membrane and shutter operate synchronously at the same frequency. In the synchronous mode of operation, the amplitude of the audio signal is controlled by any of but not limited to; the relative phase of the membrane and shutter operation; the amplitude of the shutter operation; the amplitude of the membrane operation; any combination of these.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

Figure 1:
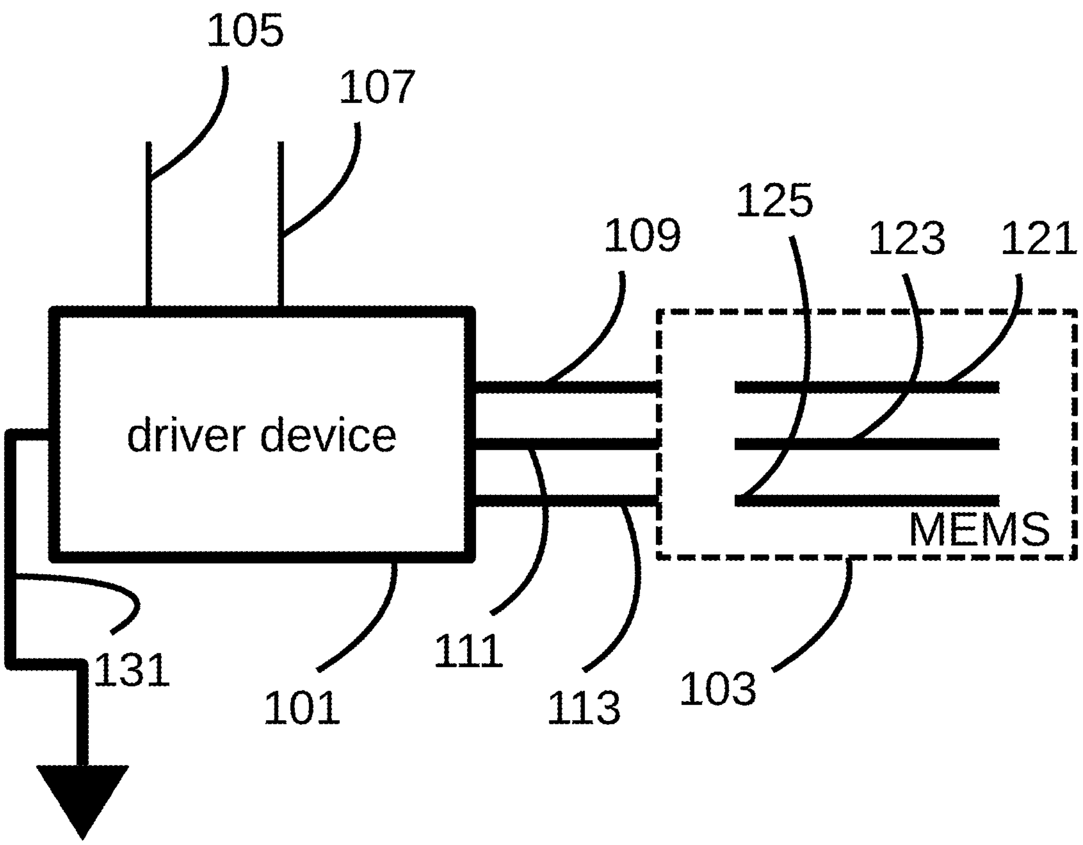
FIG. 1 is an example of a driver device configured to operate a speaker device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. This disclosure is drawn, inter alia, to methods, apparatus, computer programs, and systems of generating an audio signal.

In some examples, a speaker device is described that includes a membrane and a shutter. The membrane is configured to oscillate along a first directional path and at a combination of frequencies with at least one frequency effective to generate an ultrasonic acoustic signal. A shutter and blind are positioned proximate to the membrane. In one non limiting example the membrane, the blind, and the shutter may be positioned in a substantially parallel orientation with respect to each other. In other examples the membrane, the blind, and the shutter may be positioned in the same plane and the acoustic signal is transmitted along acoustic channels leading from the membrane to the shutter. In a further example the modulator and or shutter are composed of more than one section.

In some embodiments, the membrane is driven by an electric signal that oscillates at a frequency Ω and hence moves at b $\text{Cos}(2\pi*\Omega t)$, where b is the amplitude of the membrane movement, and t is time. The electric signal is further modulated by a portion that is derived from an audio signal a(t). The acoustic signal generated by the membrane is characterized as:

i. $$s(t)=b\ a(t)\cos(2\pi*\Omega t) \quad (1)$$

Applying a Fourier transform to Equation (1) results in a frequency domain representation i. $$S(f)=b/2*[A(f-\Omega)+A(f+\Omega)] \quad (2)$$

Where A(f) is the spectrum of the audio signal. Equation (2) describes a modulated audio signal with an upper and lower side band around a carrier frequency of Ω (Double Side Band—DSB). Applying to the acoustic signal of Equation (1) an acoustic modulator operating at frequency Ω results in i. $$S(t)=b\ a(t)\cos(2\pi*\Omega t)(l+m\ \cos(2\pi*\Omega t)) \quad (3)$$

Where l is the loss of the modulator and m is the modulation function and due to energy conservation $l+m<1$. In the frequency domain i. $$S(f)=B/4*[m\ A(f)+m\ A(f+2\Omega)+A(f-\Omega)+A(f+\Omega)] \quad (4)$$

Where b/4*m A(f) is an audio signal. The remaining terms are ultrasound signals where m A(f+2Ω) is at twice the modulation frequency and A(f−Ω)+A(f+Ω) is the original unmodulated signal. Additional acoustic signals may be present due to any but not limited to the following; ultrasound signal from the shutter movement; intermodulation signals due to nonlinearities of the acoustic medium; intermodulation signals due to other sources of nonlinearities including electronic and mechanical.

FIG. 1 is an example of a driver device (101) configured to operate a speaker device (103). In one example the driver device (101) generates two electrical signals. A first signal corresponding to equation (1) a(t) $\text{Cos}(2\pi*\Omega t+\Phi)$, and a second signal corresponding to the modulator signal as appears in equation (3) $\text{Cos}(2\pi*\Omega t+\theta)$. Where Φ and θ are constant or time varying phases. In one example Φ and θ are equal and constant. In a further example, a driver device (101) is configured with at least two inputs; a first input (105) providing an electrical audio signal and a second input (107) providing electrical power. In one example the electrical audio signal is an analog signal, and the driver device samples and converts the analog signal to a digital pulse code modulation (PCM) or pulse density modulation (PDM) signal. In an alternative example the input signal is a PCM signal. In a further example the PCM signal is provided using a standard protocol such as I2S at a sampling rate Fr, where Fr is any of but not limited to; equal to or less than 44.1K, 48K, 96 K or higher, 768 KHz or higher. In one example the first input (105) comprises of one analog input electrical line. In an alternative example, the first input (105) comprises of at least two digital input lines; a data signal and a clock signal. In a further example the first input comprises of at least three digital input lines; a data signal; a clock signal; and a control signal. In a further example a control signal includes but is not limited to; identification information; left right designation. The driver device (101) is configured with at least three connections to the speaker device (103). A first connection (109) provides the electrical signal to the shutter (121), a second connection (113) provides the electrical signal to the membrane (125) and a third connection (111) provides the electrical signal to the blind (123). In a further example, the third connection is connected to the ground line of the device driver (101). In a further example the device driver (101) includes one or more additional electrical connection (131) to the common ground of the electrical circuit. In a further example, the device driver (101) is assembled in a printed circuit board (PCB) which further includes; capacitors; battery unit; power unit; audio codec; wireless interface; Bluetooth unit; microphones; clock generator unit; inertial sensors; optical sensors.

Figure 2:
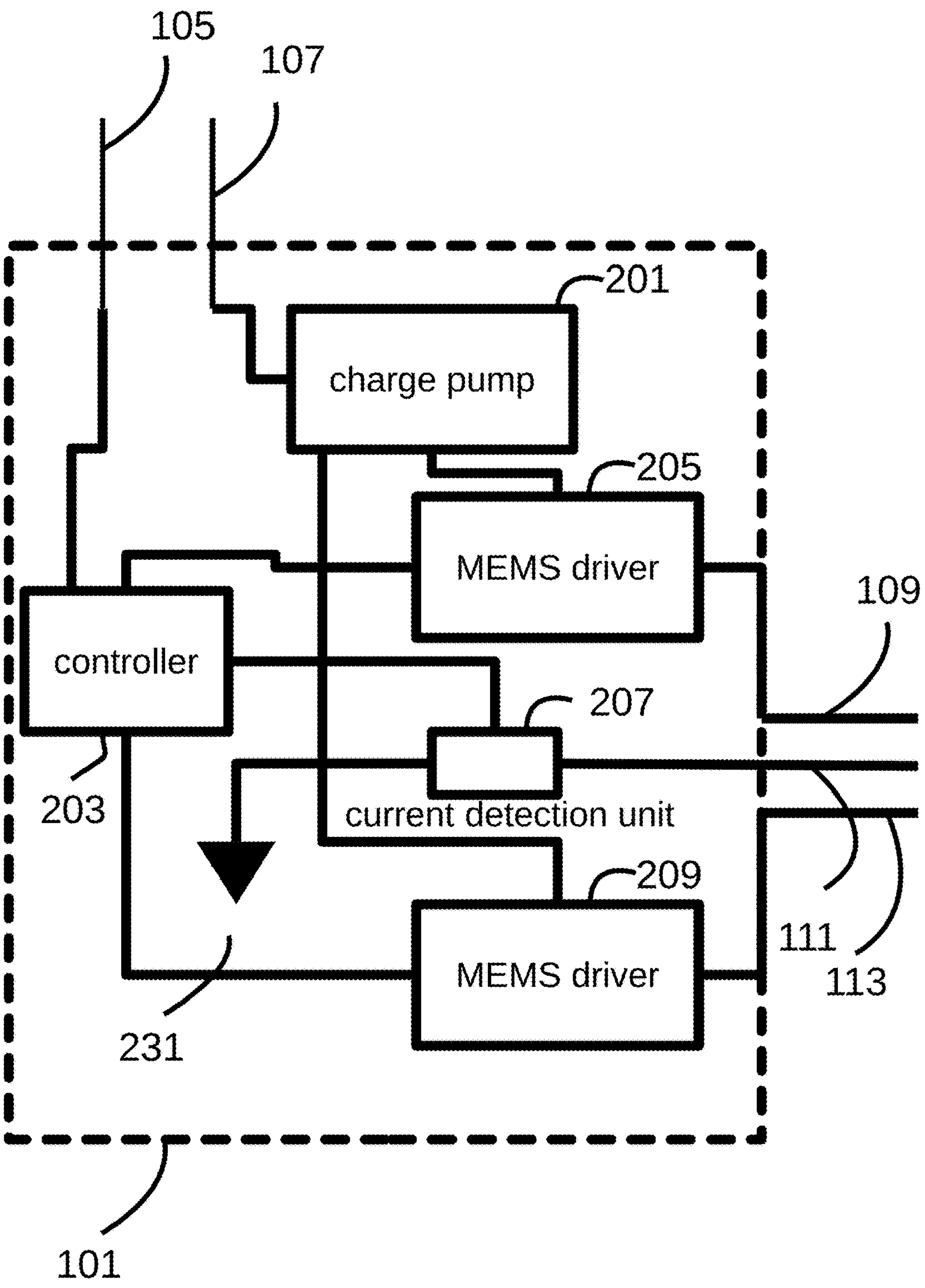
FIG. 2 is an example of a driver device with an audio signal input and configured to generate voltage signals to drive the speaker device.

FIG. 2 is an example of a driver device (101) with an audio signal input and configured to generate voltage signals to drive the speaker device. In one example a driver device (101) includes but is not limited to; a charge pump (201); controller (203); MEMS drivers (205, 209); current detection unit (207). In a further example, one MEMS driver (205) is configured to drive the modulator and a second MEMS driver (209) is configured to drive the membrane. The driver device (101) receives input power from an external power unit. Examples of operating voltages include but are not limited to; 1 Volt; 1.7 Volt; 3-4 Volt; 3.6 Volt; 4-5 Volt. The required voltages for operating the driver device are derived from the input power and the high voltage for operating the speaker device is generated by the charge pump (201). In a further example the charge pump generates any off but not limited to the following voltages; 10 Volts; 20 Volts; 20-30 Volts; 30-40 Volts; higher than 40 Volts. Examples of charge pump architectures include but are not limited to; Dickinson; Cockcroft-Walton; or combinations, using active or passive diodes. In one example, the MEMS drivers are configured as a switch with one state where the voltage supplied by the charge pump is connected to the respective speaker device membrane or modulator. The speaker device membrane or modulator is primarily a capacitor. In an alternative example, the MEMS drivers are configured as a multilevel switch where two or more voltages derived from the charge pump or intermediate stages of the charge pump are alternatively connected to the relevant membrane or modulator. By using two or more voltage levels, the maximum voltage discharge of the speaker device membrane or modulator is reduced by N where N is the number of voltage levels. The controller (203) receives the input audio signal and generates the control signals for the membrane and modulator driver. In one example, the input audio signal is an analog electrical signal, and the controller (203) includes an analog to digital conversion unit. In an alternative example the input audio signal is a digital electrical signal. Examples of digital signals include but are not limited to PCM, PDM, or PWM. The controller generates electrical signals to operate the MEMS drivers. In one example the MEMS modulator driver is driven by a binary pulse train with a repetition frequency corresponding to the mechanical resonance frequency of the modulator. In a further example, the MEMS modulator is driven by two or more signals corresponding to a multiplicity of voltage levels. In a further example, the MEMS modulator voltage level or amplitude is switched at a frequency lower than any off but not limited to; lower than 500 Hz, lower than 200 Hz, lower than 100 Hz, lower than 10 Hz. The role of the low frequency switching is to operate the MEMS modulator at one voltage level corresponding to the slowly changing average volume of the sound, in order to reduce average power consumption.

Figure 3:
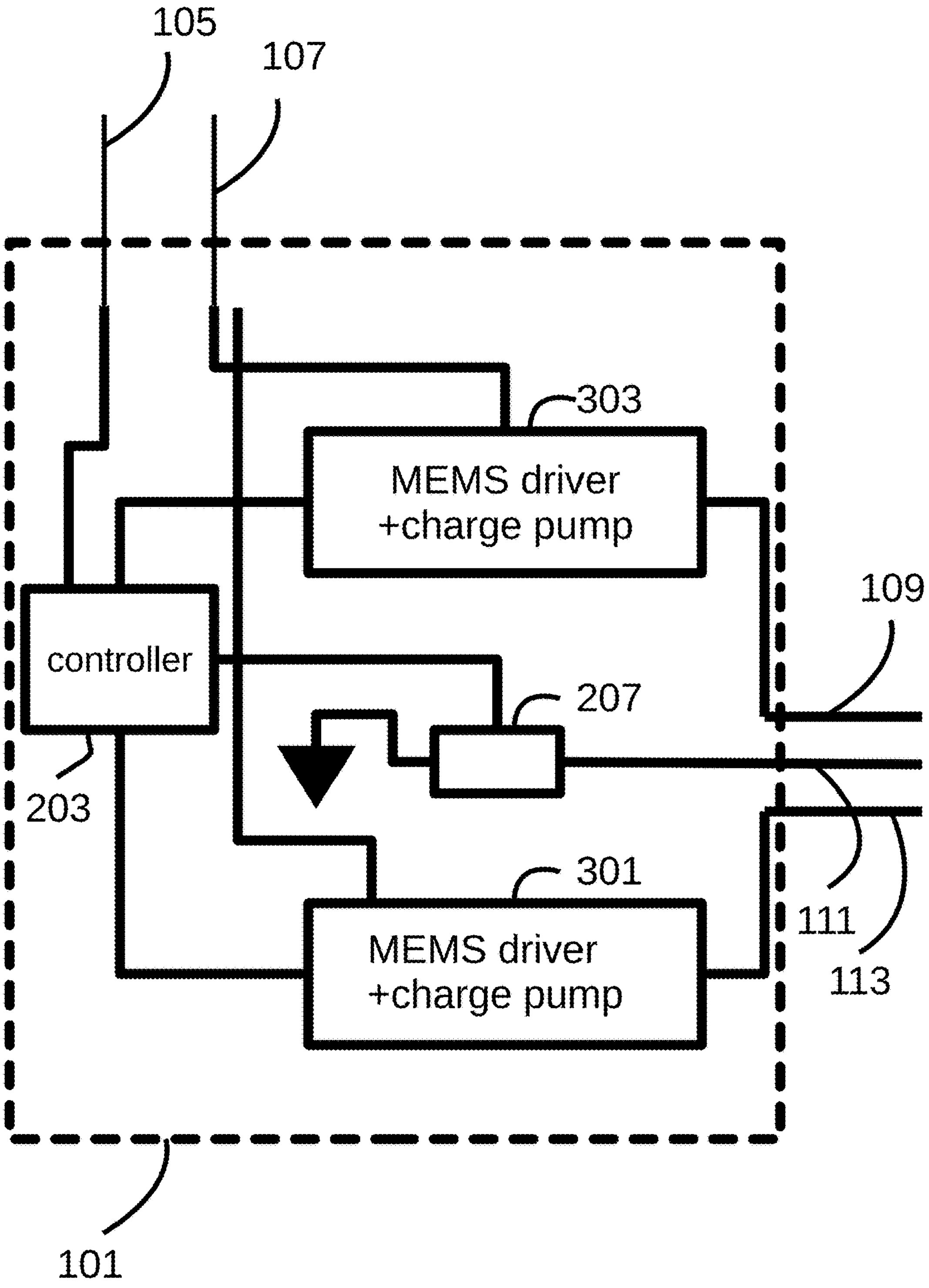
FIG. 3 is an alternative example of a driver device with a digital input and configured to generate voltage signals to drive the speaker device.

FIG. 3 is an alternative example of a driver device with a digital input (105) and configured to generate voltage signals to drive the speaker device, where the charge pump and MEMS driver are combined into one common module (301), (303).

Figure 4A:
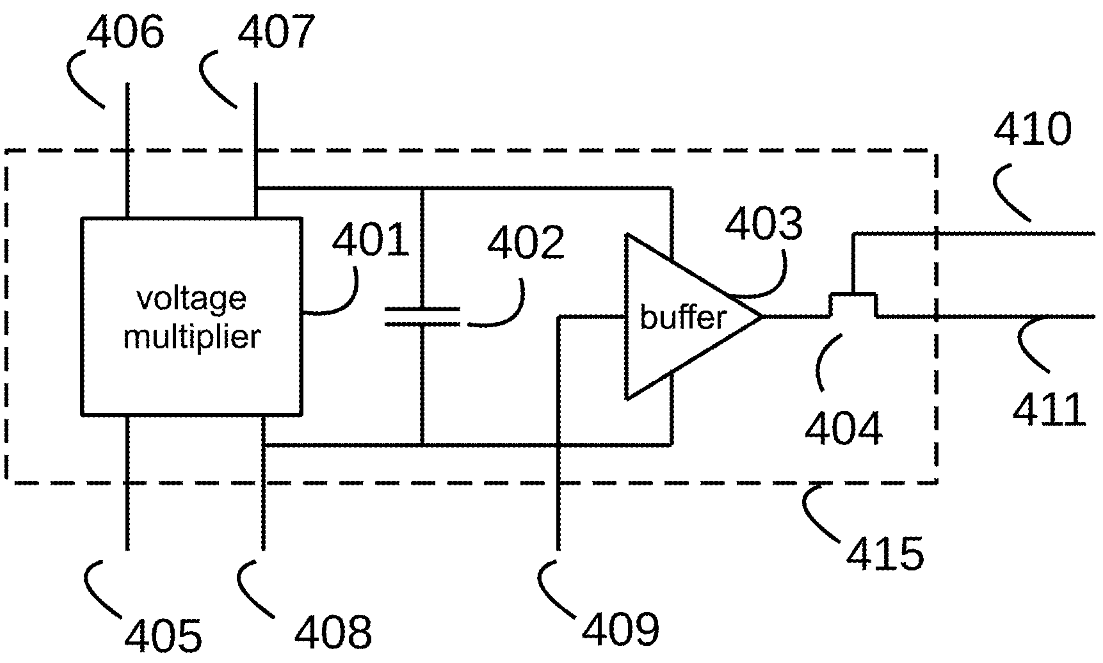
FIG. 4A-4F is an example of an integrated circuit implementation of a driver device as described in FIG. 3.

FIG. 4A is an example of a combined charge pump and output driver (CCPD) comprising of; a single or multiple stage voltage multiplier (401) with a pump input (405) and a pump output (406); a local charge storage capacitor (402) configured with at least one external connection (407 and 408); an output buffer (403); pass device (404). In one example a pump input (405) of a first CCPD is connected to pump output (406) of second CCPD. In a further example a local power supply connected between external connections (407) and (408) feeds an output buffer (403) that is controlled by buffer control input (409). In one example output buffer (403) is connected to output (411) of the CCPD through a pass device (404) controlled by an output enable signal (410). Buffer control signal (409) and or output enable signal (410) are realized as either a current or voltage signal. In a further example a pass device (403) is implemented using a low impedance NMOS or PMOS or combination of these.

The CCPD is operated width an oscillating voltage on charge pump input (405) that will generate a local voltage domain Vdd on local supply capacitor (402). By controlling buffer control signal (409) and output enable (410) the output node (411) is charged to the local Vdd (407) or discharged to local ground (408)

Figure 4B:
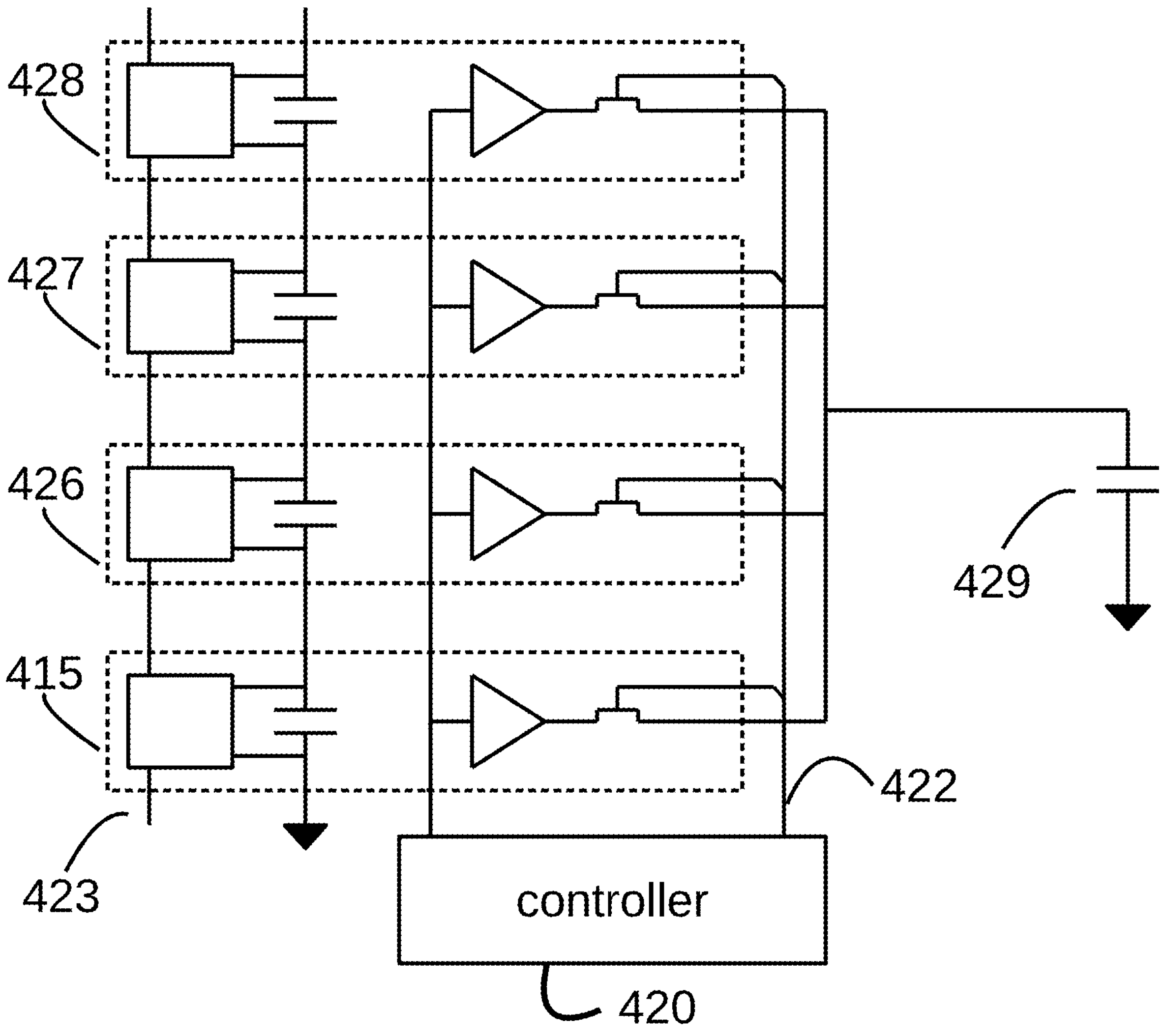

FIG. 4B is an example of a multilevel driver constructed by stacking one or more CCPD of FIG. 4A. The number of CCPD is any of but not limited to; one, two, three, four, five, six, less than 10. In one non limiting example for illustration purposes 4 CCPD (425, 426, 427 and 428) are stacked to construct a driver for a capacitive load (429). An oscillating voltage is applied to charge pump input of the lowest charge pump driver in the stack (425) the stacked CCPD (426, 427 and 428) generate a local voltage domain. In one example the system has a central controller (420) that controls each output buffer in the stacked charge pump drivers with a common signal drive_high bus (421). The central controller (420) further controls each of the buffer enable signal to each charge pump driver (425, 426, 427 and 428) through the drive_enable bus (422).

Figure 4C:
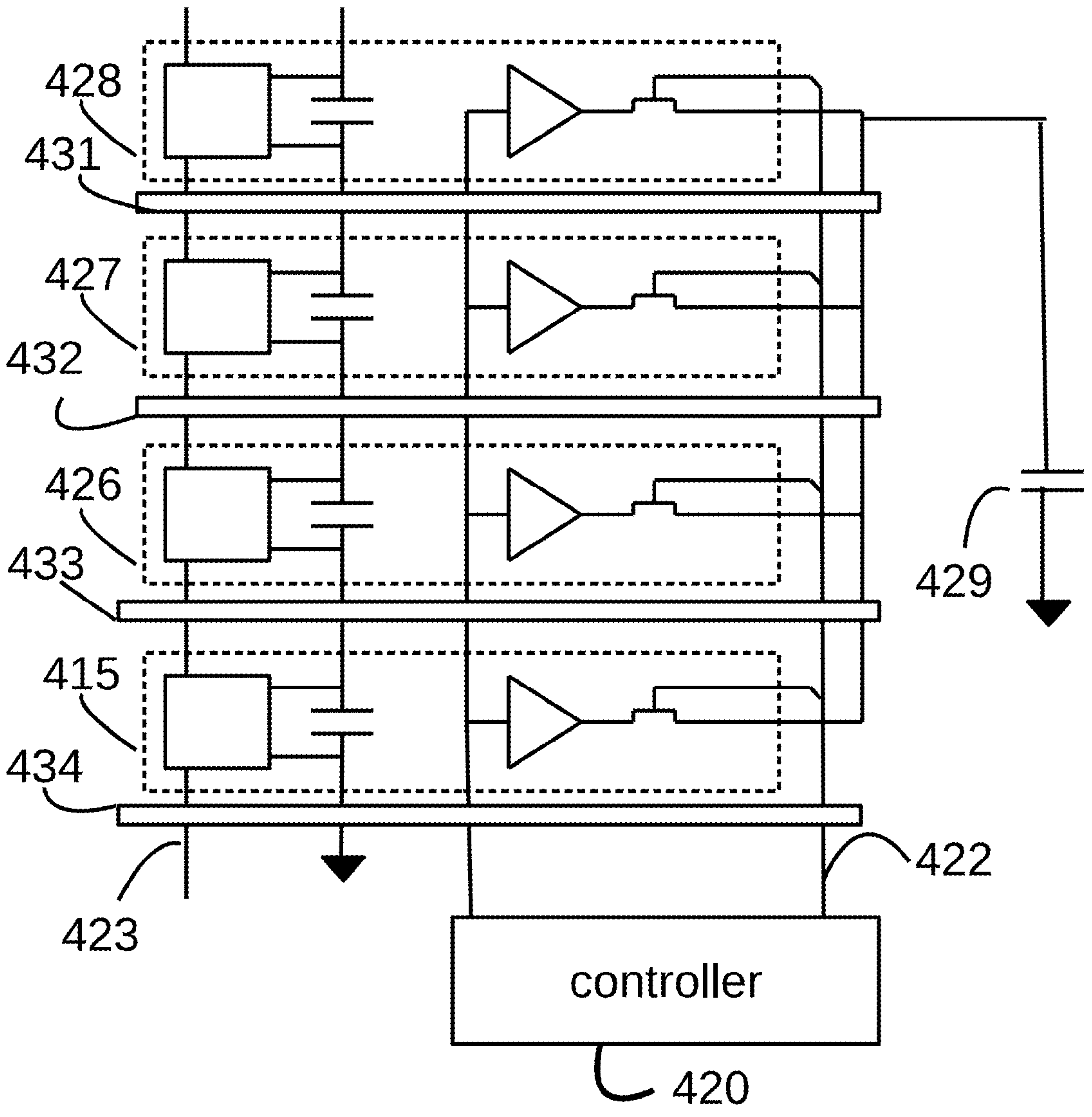
Figure 4D:
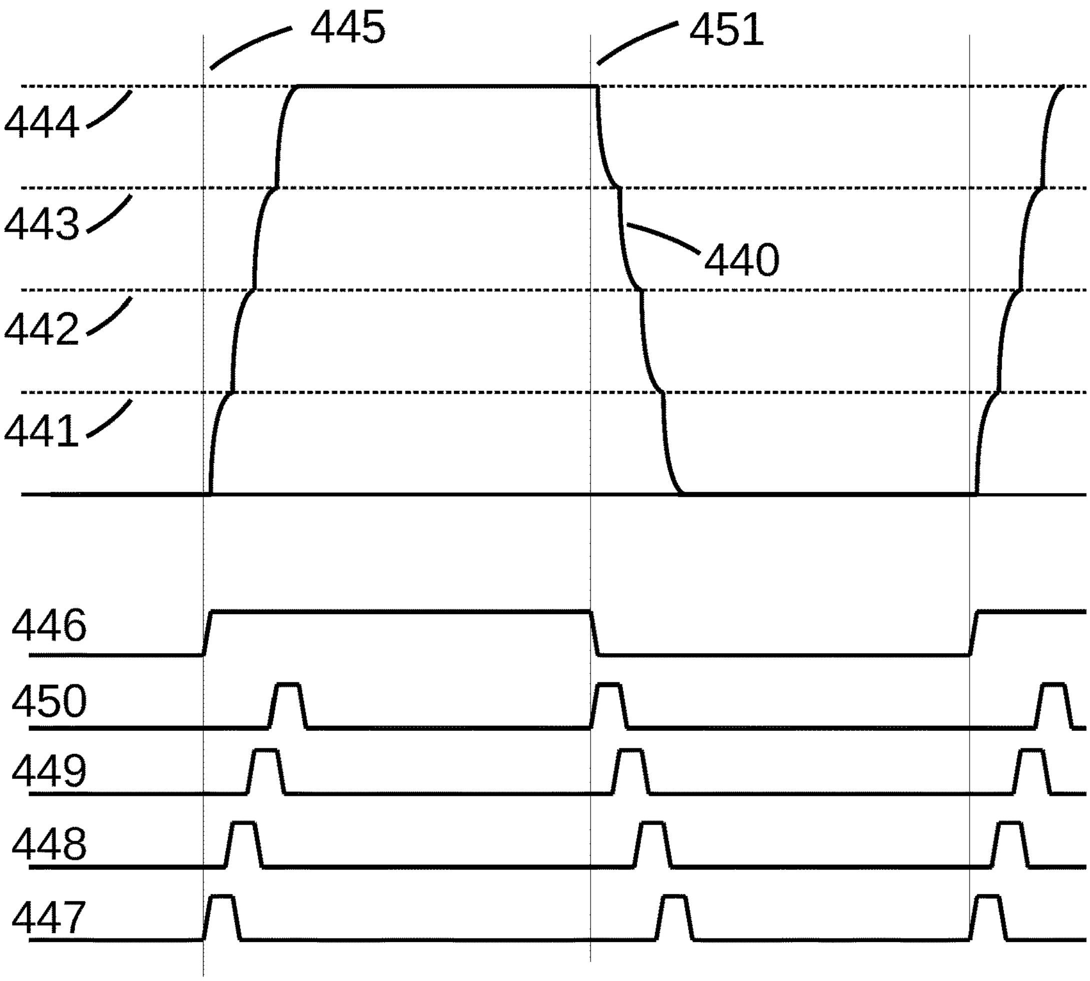

FIG. 4C is an alternative example of a multilevel driver constructed by stacking one or more CCPD of FIG. 4A, where the inputs and outputs of the CCPD are connected to one or more switching planes (431, 432, 433, 434). The switching planes are configured to connect or disconnect the CCPD to each other providing flexibility in operating the charge pump in each CCPD, and the method of charging and discharging the load capacitor (429). In one example the switching planes are operated by the central controller (420). In another example, the central controller (420) determines the driver_high or driver_enable signal for one CCPD, and the driver_high or driver_enable for other CCPD are determined by a sequence of connected CCPD determined by the switching planes (431, 432, 433, 434). FIG. 4D is an example of an output waveform generated by the multilevel driver constructed by stacking one or more CCPD of FIG. 4A. Line 440 shows the resulting output voltage at the capacitive load, where lines 441, 442, 443 and 444 are the stacked local voltage domain of each charge pump driver. Line 446 is the common buffer signal from the controller and 447, 448, 449 and 450 is the individual output enable for the CCPD cells. At t=0 the buffer control signal 'driver_high' (446) is asserted and the 'driver_enable' (447) of the lowest combined charge pump driver cell in the stack is pulsed, it will charge the output load to the local voltage domain of set charge pump driver cell (441). The other 'driver_enable' signal (448, 449 and 450) is pulsed in given sequence each raising the output load to the stacked local voltage domain the CCPD cells (442, 443 and 444). At a later time fx t=100 (451) the common signal 'driver_high' is (446) is de-asserted and while the signal 'driver_enable' to the highest combined charge pump driver cell (450) is pulsed causing the output load to be discharged to the local ground of set of combined charge pump driver cell. 'driver_enable' signals (449, 448 and 447) are pulses causing the load at the output to be discharged to a local ground for each CCPD.

Figure 4E:
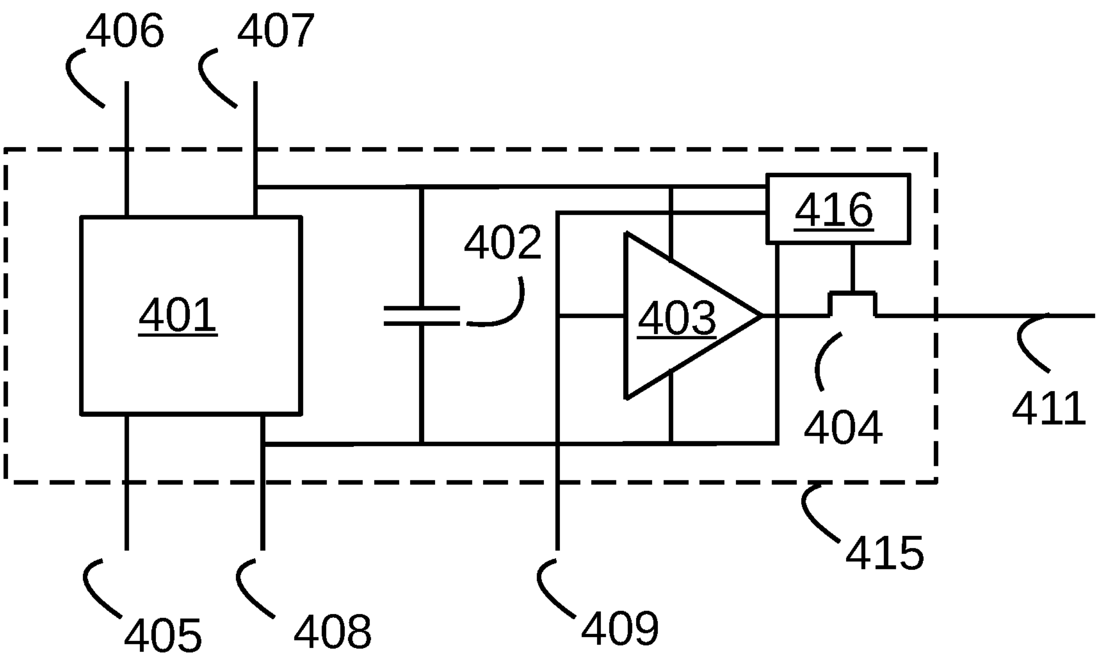

FIG. 4E is an example of an integrated circuit implementation of a driver system with autonomous activation circuit. Each driver cell has local sensing circuit to charge or discharge the load as a function of 'driver_enable' signal, local voltage domain (LVDD to LGND) and the load voltage.

Figure 4F:
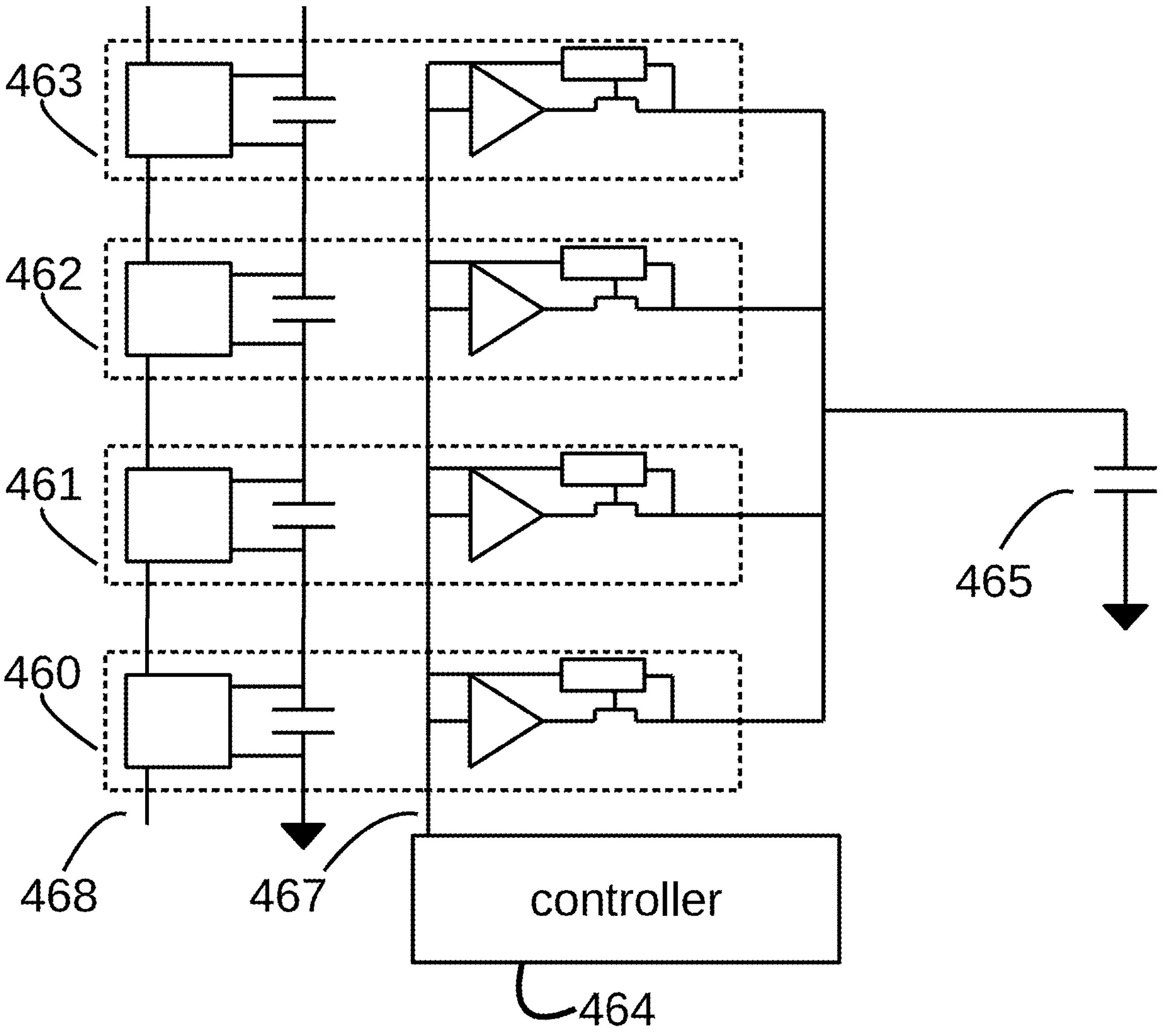

FIG. 4F show a circuit implementation of a driver cell from FIG. 4C with autonomous activation circuit. The complexity of the controller (464) is significantly reduced and is now independent of the number of CCPD cells in the stack.

Figure 4G:
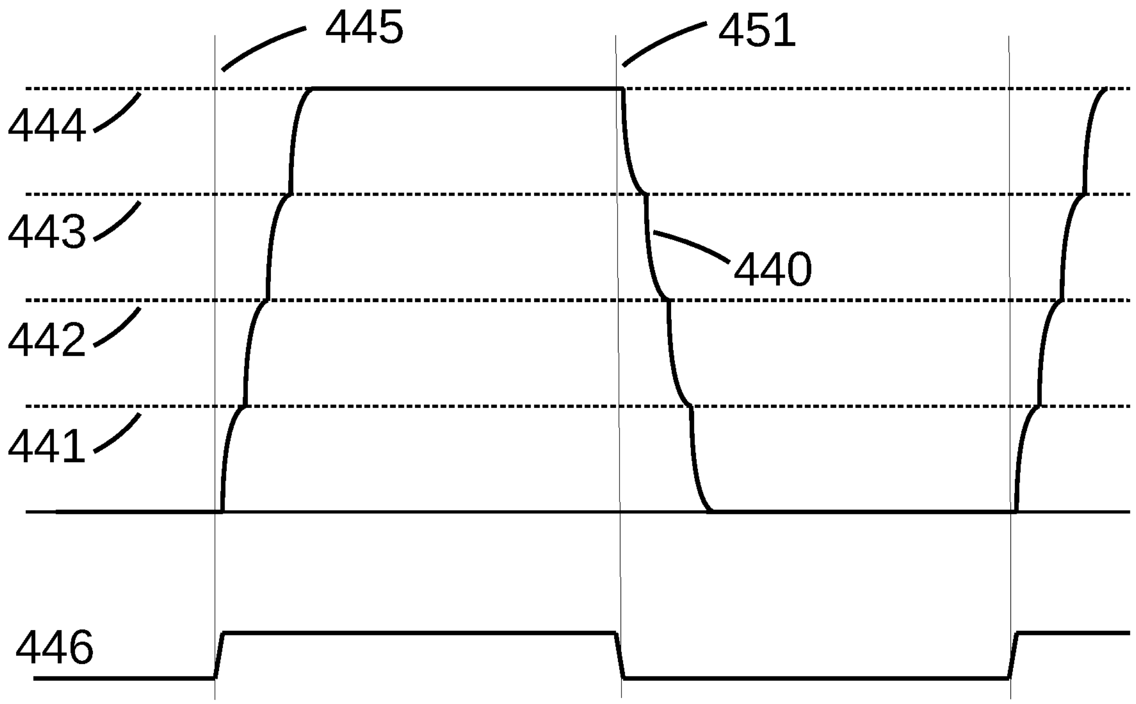
FIG. 4G is an example of the waveform from a system described in FIG. 4F.

FIG. 4G is an example of the waveform from a system described in FIG. 4F. The system generates the same resulting output voltage waveform (440) as is FIG. 4D without the enable signal to each CCPD cell in the stack.

Figure 5A:
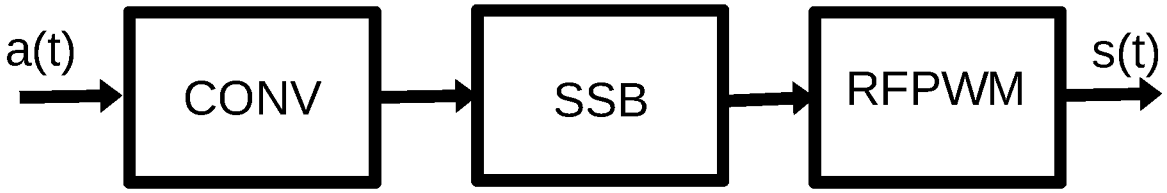
FIG. 5A is an example of a schematic description of operating voltage generation from an audio signal.
Figure 5B:
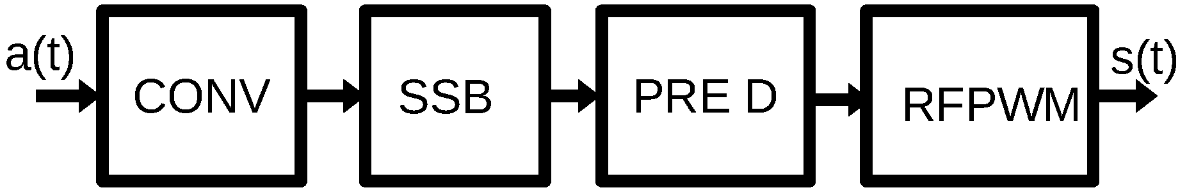
FIG. 5B is a further example of a schematic description of operating voltage generation from an audio signal.

FIG. 5A is an example of a schematic description of a method executed in a controller of operating the MEMS driver for the speaker device membrane from an audio signal. The audio signal (a(t)) is received at a first sampling rate and converted to a second sampling rate in the CONV block. In one example the first and second sampling rate are the same frequency. In a further example the second sampling rate is at least any of but not limited to; twice the modulator mechanical resonance frequency; 768 KHz. If the first and second sample rate are not the same frequency, the CONV block converts the first rate to the second sampling rate using an up-sampling conversion algorithm and digital low pas filtering. In a further example, the digital low pass filtering is designed for minimal latency. In another example the second sampling rate is chosen as an integer multiple of the first sampling rate. The audio signal at a second sampling rate is modulated by a single side band modulator (SSB) to generate a single side band modulated audio signal. Single side band modulation is facilitated by summing the multiplication of the audio signal by $\mathrm{Cos}(2\pi^*\Omega t+\varphi)$ and of the multiplication of the Hilbert transform of the audio signal by $\mathrm{Sin}(2\pi^*\Omega t+\varphi)$. In an alternative example, double side modulation as described in equation (1) is used instead of SSB modulation, where $\Omega$ is the mechanical resonance frequency of the speaker modulator. The SSB modulated audio signal which is converted into a binary signal by the RFPWM unit. The RFPWM uses a bandpass sigma delta modulator to reduce the quantization error in the audio band around $\Omega$. In one example the audio band is smaller than any off but not limited to; +/−20 KHz; +/−30 KHz; +/−40 KHz; +/−50 KHz; or 20 KHz; 30 KHz; 40 KHz; 50 KHz. In an alternative example the SSB modulation and RFPWM functionality are combined in a quadrature sigma delta modulator implementation. The resulting signal s(t) is applied as an input signal to the output switch or switches driving the CMUT load. FIG. 5B is a further example of a schematic description of operating voltage operation signal from an audio signal including a pre distortion unit (PRED) prior to the RFPWM modulation. The pre distortion unit is a memoryless nonlinear block implementing the reciprocity of the nonlinear elements of any off but not limited to; the RFPWM modulator; and or the speaker device membrane layer.

Figure 6A:
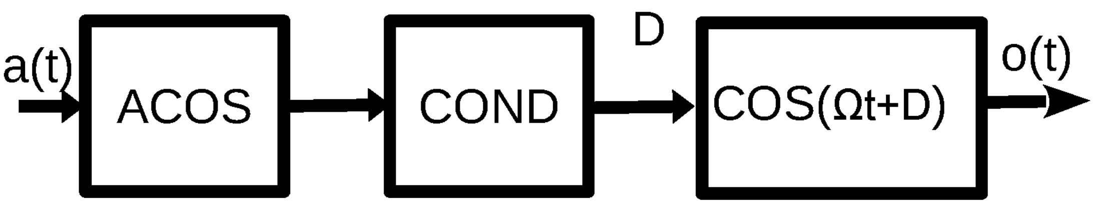
FIG. 6A is an alternative example of schematic description of generating a voltage operation signal from an audio signal.

FIG. 6A is an alternative example of schematic description of generating a voltage operation signal from an audio signal. The implementation is based on the observation that the MEMS speaker functions as a pump, where the flow of air is determined by the phase difference between the modulator membrane and the ultrasound membrane (121, 125 in FIG. 1). Following equation (1), an alternative way of driving the ultrasound membrane is a. $s(t)=\cos(2\pi^*\Omega t+D)$ (5)

where D=f(a(t)) is a phase delay determined by f( ) a function of the input signal. In one example f( ) is a trigonometric function, configured to provide a linear acoustic response related to a(t). The acoustic signal is related to $$o(t)=\cos(2\pi^*\Omega t)^*\cos(2\pi^*\Omega t+D) \quad (6)$$

where $\cos(2\pi^*\Omega t)$ is the modulator functionality. Using trigonometric relations, we obtain that the low frequency audio portion of o(t)~cos(D). Hence a suitable function for f( ) in this example is a cos( ) It should be noted, that sin ( ) and cos( ) are interchangeable and any fixed phase can be added in equation (6) to either the membrane or modulator without any change in performance. In practice since D is a time delay in the membrane drive signal, D is quantized, where the quantization is determined by the system clock. For example, if the system clock T is 20 MHz, the time delay is quantized by T=1/20E6=50 ns. In alternative example if T is 50 MHz, the time delay is quantized by 20 ns. The quantization introduces quantization noise. In one example, the quantization noise is reduced using sigma delta modulation represented by the COND block. In a further example, the COND block includes a pre distortion unit, where the pre distortion unit is a memoryless nonlinear block implementing the reciprocity of the nonlinear elements of any off but not limited to; the signal driver; and or the speaker device membrane layer. The resulting signal o( ) is used to drive one or more of the switches providing voltage to the membrane and or modulator CMUT. In a further example, D can be split between both membrane and modulator.

Figure 6B:
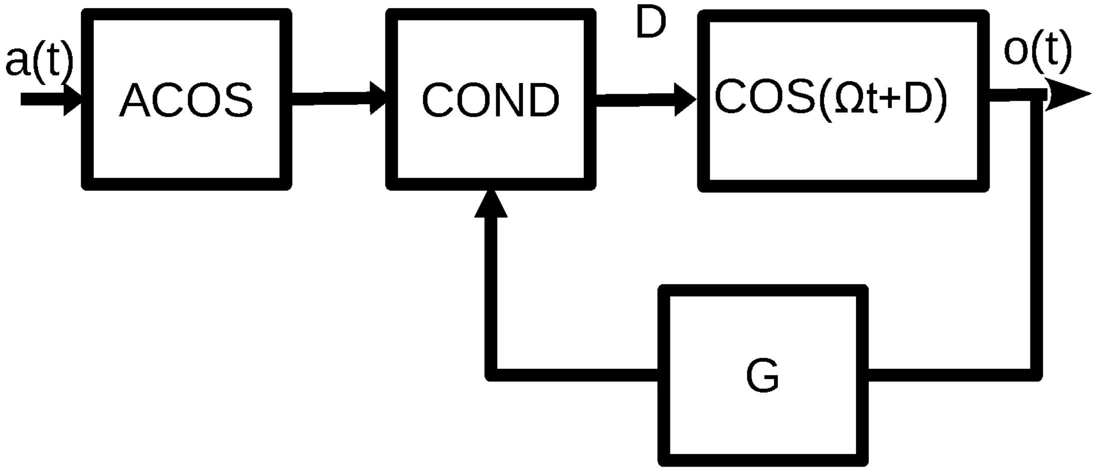
FIG. 6B is a further example of schematic description of generating a voltage operation signal from an audio signal.

FIG. 6B is a further example of schematic description of generating a voltage operation signal from an audio signal. Where the output o(t) is feedback to the COND unit through a function G, where G can be any of but not limited to; delay; filter or filters; multiplication by constant; nonlinear function; or any combination of these. The feedback signal and COND block are configured to reduce the noise and distortion of the generated audio signal in comparison to the input signal.

Figure 6C:
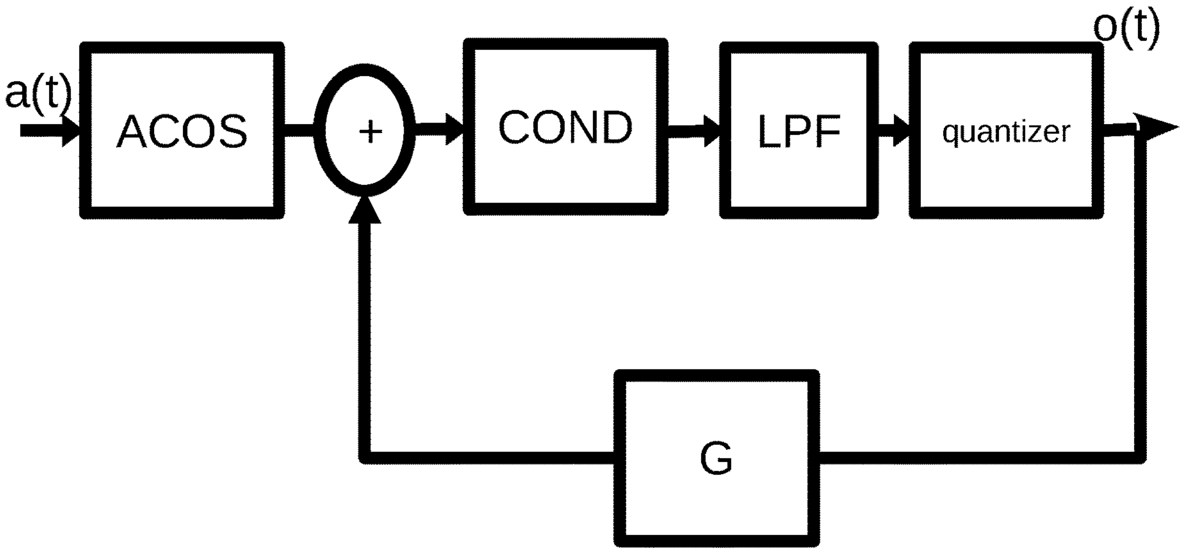
FIG. 6C is an example of an implementation of the voltage generation concept described in FIG. 6B.

FIG. 6C is an example of an implementation of the voltage generation concept described in FIG. 6B. An audio signal is combined with a feedback signal; a conditioning (COND) unit applies pre distortion algorithms to counteract system non linearities; the result is fed into a low pass filter with a cut off set at least at any off but not limited to; 20 KHz, 30 KHz, 40 KHz; the low pass filtered signal is quantized to 2^N levels where N is any off $2<N<32$; the output signal provides the phase D for the output voltage to the membrane $\cos(2\pi^*\Omega t+D)$, while the modulator is operated at $\cos(2\pi^*\Omega t)$. In another example D can be split between shutter and modulator.

In a further example, the methods of operating the driver device include methods for extending the number of bits in the input signal. In one example an input audio signal consists of N bits, providing $2^N$ levels of audio signal. As described in FIGS. 5 and 6, there are methods including sigma delta to use less levels than $2^N$, but recover the levels by noise shaping of the quantization noise. Methods of extending the directly applicable number of bits include; In multi-level drives as described in FIG. 2, 3 or 4, one or more of the high bits can be used to determine the voltage level of the voltage driver, or the number of voltage drivers activated in a stacked implementation. In one example using 2 voltage levels for either membranes will require the two topmost bits, a first bit for the voltage driver for the modulator and a second bit for the voltage driver to the membrane. In a similar manner we can extend the number of usable bits by increasing the number of levels, where 4 levels require a total of 4 bits and 8 levels require a total of 6 bits. The remaining bits are used as the audio input signal in the methods described in FIG. 5 and FIG. 6.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.". Speaker and picospeaker are interchangeable and can be used in in place of the other.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A driver device for operating a speaker comprising:
a power source;
two or more voltage drivers each including a MEMS driver configured to receive voltage from the power source;
a controller;
wherein the speaker includes at least a membrane and a shutter, and
wherein the controller is configured to receive a digital audio signal and operate the two or more voltage drivers such that at least one of the voltage drivers drives the membrane with a pulsed electrical signal comprising at least two or more voltage levels and another of the voltage drivers drives the shutter with a pulsed electrical signal comprising at least two or more voltage levels to generate an audio signal from the speaker.

2. The driver device according to claim 1, where the power source is one of: a step up convertor; a charge pump; or a battery voltage.

3. The driver device according to claim 1, where the power source and the MEMS driver are combined in one functional unit with an output voltage smaller than a target drive signal voltage.

4. The driver device according to claim 3, where multiple combined power source and MEMS driver are configured so that the summation of voltages thereof provides a required drive signal voltage.

5. The driver device according to claim 1, where the controller is configured to operate by: receiving an audio signal; modulation of the audio signal; wherein at least one MEMS driver is configured to provide a voltage according to the modulated audio signal and at least a second MEMS driver is configured to provide an oscillating voltage at a modulation frequency.

6. The driver device according to claim 1, where the controller is configured to operate by: receiving an audio signal; predistortion of the audio signal; wherein at least one MEMS driver is configured to provide an oscillating voltage at a target frequency with a phase defined by the predistorted audio signal and at least a second MEMS driver is configured to provide an oscillating voltage at a target frequency.

7. The driver device according to claim 6, where the target frequency is in the range between 100 KHz and 1 MHz.

8. The driver device of claim 1, wherein the controller is configured to generate a single side band modulated audio signal and to convert the single side band modulated audio signal into a binary signal received by the voltage drivers.

9. A driver device and speaker structure comprising:
a speaker comprising:
at least one membrane positioned in a first plane and configured to oscillate along a first directional path and at a first frequency effective to generate an ultrasonic acoustic signal; and
a shutter positioned in a second plane that is substantially separated from the first plane; and
a driver device comprising:
a power source;
first and second MEMS voltage drivers configured to receive voltage from the power source;
a controller;
wherein the controller is configured to receive an input audio signal and 1) operate the first MEMS voltage driver with a pulsed electrical signal comprising at least two or more voltage levels to generate a modulated audio signal to operate the at least one membrane and 2) operate the second MEMS voltage driver with a pulsed electrical signal comprising at least two or more voltage levels to generate an ultrasonic modulated signal and operate the shutter at the modulation frequency to demodulate the ultrasonic modulated signal and generate an acoustic audio signal.

10. The structure according to claim 9, where the power source is any of step up convertor; a charge pump; a battery voltage.

11. The structure according to claim 9, where the power source and the first and second MEMS voltage driver are combined in one functional unit with an output voltage smaller than a target drive signal voltage.

12. The structure according to claim 11, where multiple combined power source and the first and second MEMS voltage driver are configured so that the summation of voltages thereof provides a required drive signal voltage.

13. The structure according to claim 9, where the controller is configured to operate by; receiving an audio signal; modulation of the audio signal; wherein the first MEMS voltage driver is configured to provide a pulsed electrical signal with at least two voltage levels according to the modulated audio signal and the second MEMS voltage driver is configured to provide an oscillating pulsed electrical signal with at least two voltage levels at a modulation frequency.

14. The structure according to claim 9, where the controller is configured to operate by; receiving an audio signal;

predistortion of the audio signal; wherein the first MEMS voltage driver is configured to provide an oscillating pulsed electrical signal with at least two voltage levels at a target frequency with a phase defined by the pre-distorted audio signal and the second MEMS voltage driver is configured to provide an oscillating pulsed electrical signal with at least two voltage levels at a target frequency.

15. The structure according to claim 14, where the target frequency is in the range between 100 KHz and 1 MHz.

16. The structure of claim 9, wherein the controller is configured to generate a single side band modulated audio signal and to convert the single side band modulated audio signal into a binary signal received by the voltage drivers.

17. A driver device for operating a speaker, the speaker having a membrane and a shutter, the driver device comprising:

a controller;

a charge pump configured to generate a high voltage signal;

a first MEMS driver and a second MEMS driver configured to modulate the high voltage signal, wherein the controller is configured to receive a digital sound data stream and an operating voltage and operate the first MEMS driver to generate a pulsed electrical signal with at least two voltage levels to drive the membrane and operate the second MEMS driver to generate a pulsed electrical signal with at least two voltage levels to drive the shutter to generate an audio signal from the speaker.

18. The driver device of claim 17, wherein the controller, charge pump and switching unit are part of a semiconductor integrated circuit.

19. The driver device of claim 17, wherein the controller is configured to generate a single side band modulated audio signal and to convert the single side band modulated audio signal into a binary signal received by the voltage drivers.

* * * * *